United States Patent [19]

Presz, Jr. et al.

[11] Patent Number: 4,786,016

[45] Date of Patent: Nov. 22, 1988

[54] BODIES WITH REDUCED SURFACE DRAG

[75] Inventors: Walter M. Presz, Jr., Wilbraham, Mass.; Robert W. Paterson, Simbury; Michael J. Werle, W. Hartford, both of Conn.

[73] Assignee: United Technologies Corporation, Hartford, Conn.

[21] Appl. No.: 117,765

[22] Filed: Nov. 5, 1987

Related U.S. Application Data

[63] Continuation-in-part of Ser. No. 857,909, Apr. 30, 1986, abandoned.

[51] Int. Cl.$^4$ .............................................. B64C 1/38
[52] U.S. Cl. ................................ 244/130; 244/53 R; 239/265.19
[58] Field of Search ............... 244/130, 199, 200, 204, 244/53 B, 54, 53 R; 416/236 R, 335; 415/DIG. 1; 239/265.19; 60/262, 264

[56] References Cited

U.S. PATENT DOCUMENTS

| | | | |
|---|---|---|---|
| 2,899,128 | 8/1959 | Vaghi | 416/235 |
| 2,962,101 | 11/1960 | Vaghi | 416/235 |
| 2,968,150 | 1/1961 | Goebel et al. | |
| 4,066,214 | 1/1978 | Johnson | 239/265.19 |
| 4,117,671 | 10/1978 | Neol et al. | 60/264 |
| 4,240,252 | 12/1980 | Sargisson et al. | 60/262 |
| 4,576,002 | 3/1986 | Mavrocostas | 60/262 |
| 4,592,201 | 6/1986 | Dusa et al. | 60/262 |

FOREIGN PATENT DOCUMENTS 2083420  3/1982  United Kingdom ............... 244/130

Primary Examiner—Galen Barefoot
Assistant Examiner—L. M. Fiorito
Attorney, Agent, or Firm—Stephen E. Revis

[57] ABSTRACT

A casing surrounding a fluid stream over which an unbounded fluid flows in a downstream direction has a plurality of alternating, adjoining troughs and ridges in its external surface, extending in the downstream direction to a thin trailing edge of the casing, which will thereby have a wave-like shape.

5 Claims, 7 Drawing Sheets

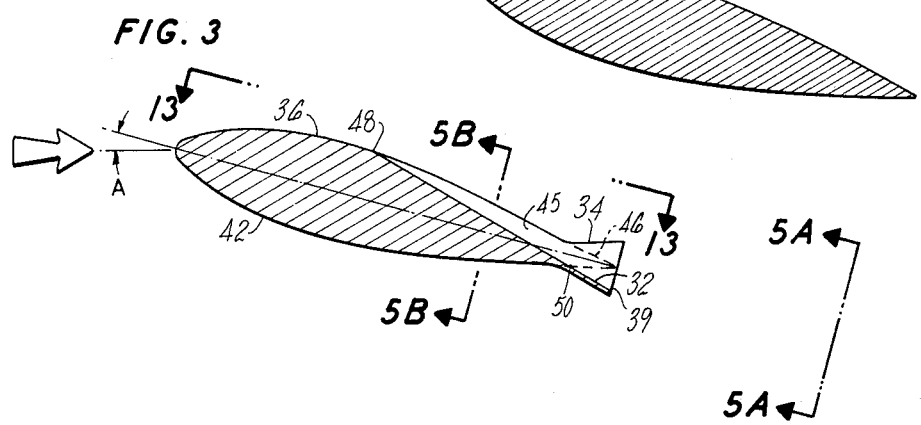
FIG. 2A
FIG. 3
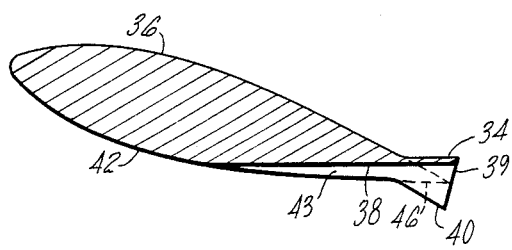
FIG. 4
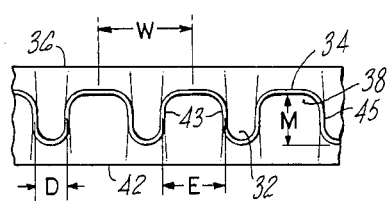
FIG. 5A
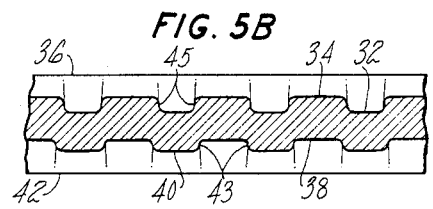
FIG. 5B

BODIES WITH REDUCED SURFACE DRAG

REFERENCE TO RELATED APPLICATIONS

This application is a continuation-in-part application of U.S. Ser. No. 857,909, filed Apr. 30, 1986, now abandoned.

Reference is hereby made to the following co-pending, commonly owned U.S. patent applications disclosing subject matter related to the subject matter of the present application: (1) U.S. Ser. No. 857,907 entitled, *Airfoil-Shaped Body*, by W. M. Presz, Jr. et al filed 4/30/86; (2) U.S. Ser. No. 857,908 entitled, *Fluid Dynamic Pump*, by W. M. Presz, Jr. et al filed 4/30/86; (3) U.S. Ser. No. 857,910 entitled, Diffuser, by W. M. Presz, Jr. et al filed 4/30/86; (4) U.S. Ser. No. 947,163 entitled *Projectile with Reduced Base Drag* by R. W. Paterson et al filed 12/24/86; (5) U.S. Ser. No. 947,164 entitled *Bodies with Reduced Base Drag*, by R. W. Paterson et al filed 12/29/86; (6) U.S. Ser. No. 947,166 entitled *Improved Airfoil Trailing Edge*, by M. J. Werle et al filed 12/29/86; and (7) U.S. Ser. No. 947,349 entitled *Heat Transfer Enhancing Device*, by W. M. Presz, Jr. et al filed 12/29/86.

FIELD OF THE INVENTION

The present invention relates to reduced drag flow surfaces.

PRIOR ART

Drag is the result of skin friction and surface pressure variations induced by viscous effects, especially those due to separation bubbles or regions i.e., low pressure wakes). Separation regions occur when two and three dimensional boundary layers depart from the surface of the body. Bluff or blunt bodies have shapes which tend to promote a rapidly increasing downstream pressure gradient in the streamline flow around it which can cause the bulk flow to break loose from the surface of the body. Airfoil shaped bodies such as airplane wings, rudders, sails, and gas turbine engine rotor blades and stator vanes have a streamlined shape which, at moderate angles of attack (below about 15) avoid streamwise two-dimensional boundary layer separation over the entire surface. At higher angles of attack (or increased loading) separation does occur and a recirculating flow region (or a low pressure wake) is formed, greatly increasing drag and reducing lift. As used in the specification and appended claims, "streamwise, two-dimensional boundary layer separation" means the breaking loose of the bulk fluid from the surface of a body, resulting in flow near the wall moving in a direction opposite the bulk fluid flow direction.

It has been a constant goal of aerodynamicists to reduce the drag and improve lift and stall characteristics on bodies disposed in a fluid moving relative thereto. A common way to avoid boundary layer separation on an airfoil (or other streamlined body) or to at least delay separation such that it occurs as far downstream along the surface of the airfoil as possible so as to minimize drag, is to reduce the pressure rise downstream such as by tailoring the surface contour along the length of the airfoil in the direction of bulk fluid flow.

Another well known method for reducing the drag on airfoils is to create turbulence in the boundary layer so as to impart a greater average momentum of the boundary layer fluid, which carries it further downstream along the surface against an adverse pressure gradient, thereby delaying the separation point. One technique for increasing the momentum of the boundary layer is to generate streamwise vortices such as by using the ramp-type vortex generators shown in U.S. Pat. No. 2,800,291 to Stephens.

U.S. Pat. No. 4,455,045 to Wheeler describes elongated, expanding channels in the flow surface. The channels have sharp, lengthwise edges. The boundary layer on the surface flows into the channels, and the channel edges create streamwise vortices below the level of the normal flow surface which energize the flow in the channel to maintain boundary layer attachment of the flow along the floor of the channel.

In U.S. Pat. No. 1,773,280 to Scott, increased lift without increased drag is created for an aircraft wing by placing a plurality of side by side chordwise extending ridges along the top of the wing from its leading to its trailing edge, the ridges having their highest point near the thickest portion of the wing. The ridges themselves are airfoil shaped when viewed from above, tapering to a point at the trailing edge of the wing. This concept does not take into account viscous induced boundary layer separation effects and therefore could not be expected to avoid separation at high lift conditions.

U.S. Pat. No. 3,588,005 to Rethorst uses chordwise extending ridges in the upper surface of an airfoil to delay the onset of separation by providing "channels of accelerated flow in the free stream flow direction to add energy to the boundary layer and maintain laminar flow in the region of normally adverse pressure gradient." The ridges protrude from the surface "to a height of the order of the boundary layer thickness". Cross flow components "are accelerated over the ridges and may reduce the likelihood of separation near the aft end ... of the body by allowing the flow to 'corkscrew' smoothly off the aft end rather than encounter the abrupt adverse pressure gradient in the free stream direction caused by a blunted aft end." As with the ridges of the Scott patent discussed above, flow is also accelerated between the ridges which further helps maintain laminar flow over the airfoil surface.

U.S. Pat. Nos. 3,741,235 and 3,578,264 to Kuethe delay separation by creating vortices using a series of crests or concave depressions which extend substantially transverse to the streamwise flow direction. Kuethe states that the maximum height of a crest or depth of a depression is preferably less than the boundary layer thickness.

In a paper titled "The Reduction of Drag by Corrugating Trailing Edges" by D. L. Whitehead, M. Kodz, and P. M. Hield published by Cambridge University, England in 1982, blunt base drag of a blade (having a 20-inch span, 20 inch chord length, a constant thickness of 1.5 inches and a blunt trailing edge) is reduced by forming the last seven inches of its chordwise length into streamwise extending, alternating troughs and ridges (corrugations). The trailing edge and any upstream cross-section across the corrugations has the shape of a sine wave with an 8.0 inch wavelength. The thickness of the blade material is maintained constant over the length of each trough and ridge, although the trough depth or ridge height (i.e., wave amplitude) transitions from a maximum of 2.0 inches at the trailing edge to zero upstream. FIGS. 15-17 show the blade described therein, with dimensions given in terms of a unit length "a". A reduction of base drag of about onethird was realized when compared with a reference blade without corrugation. It is explained that spanwise vortices which were shed alternately from the top and bottom rear edges of the non-corrugated reference blade were eliminated by the corrugations. No mention is made in the paper of surface separation.

In general, it is believed that the separation delaying devices of the prior art create significant drag in their own right, thereby negating some of the benefits they would otherwise provide. This sometimes limits their effectiveness. While many of the devices of the prior art have proved to be effective in reducing drag and/or in permitting somewhat higher angles of attack before the onset of stall, further improvement is still desired. Even an additional reduction in drag of only 1%, or enabling an airfoil to operate without stalling at a relatively small increased angle of attack is considered valuable; yet, additional improvements of even small magnitude have been found to be very difficult to attain considering the present highly developed state of the art.

DISCLOSURE OF INVENTION

One object of the present invention is to eliminate or delay the onset of streamwise two-dimensional boundary layer separation from the surface of a moving body.

Another object of the present invention is to minimize the drag created by fluids flowing over the exposed surface of an engine casing or nacelle.

According to the present invention, a casing surrounding a fluid stream over which an unbounded fluid flows in a downstream direction has a plurality of alternating, adjoining troughs and ridges in its external surface, extending in the downstream direction to a thin trailing edge of the casing, which will thereby have a wave-like shape.

The present invention is particularly suited to eliminating or reducing "boattail" drag, which is the drag created by viscous losses due to streamwise two-dimensional boundary layer separation from the surface of convexly curved, streamlined ducts or casings surrounding, for example, gas turbine engines. Often length restrictions necessitate the use of curvatures which are steeper than desirable. The trough and ridge construction of the present invention can delay the onset of separation or even eliminate it despite such length restrictions.

To have the desired effect of preventing or reducing the area of streamwise two-dimensional boundary layer separation on the external surface of the casing, it is believed that the sum of the depth and height of the troughs and ridges respectively, at the trailing edge (i.e. the peak-to-peak wave amplitude at the trailing edge) will need to be at least about twice the 99% boundary layer thickness immediately forward of the upstream ends of the troughs.

It is believed that the trough and ridge construction of the present invention delays or prevents the catastrophic effects of two-dimensional boundary layer separation by providing three-dimensional relief for the low momentum boundary layer flow. The local flow area variations created by the troughs and ridges produce local control of pressure gradients and allow the boundary layer approaching an adverse pressure gradient region to move laterally instead of separating from the wall surface. It is believed that as the boundary layer flows downstream and encounters a ridge, it thins out along the top of the ridge and picks up lateral momentum on either side of the peak of the ridge toward the troughs. In corresponding fashion, the boundary layer flowing into the trough is able to pick up lateral momentum and move laterally on the walls of the trough on either side thereof. The net result is the elimination of two-dimensional boundary layer separation because the boundary layer is able to run around the pressure rise as it moves toward the trailing edge. The entire scale of the mechanism is believed to be inviscid in nature and not tied directly to the scale of the boundary layer itself.

It is believed that best results are obtained when peak-to-peak amplitude at the trailing edge is comparable to the separation bubble (or wake) thickness which would be expected to occur at the trailing edge if the casing did not incorporate the troughs and ridges of the present invention. This will generally result in trough depth and ridge heights many times larger (often orders of magnitude larger) than the boundary layer thickness.

To prevent or at least delay streamwise two-dimensional boundary layer separation from occurring on the surface of the casing, the troughs and ridges must start upstream of where separation would otherwise be likely to occur during operation. The trough depth and ridge height start at zero and increase toward the trailing edge to respective maximum dimensions.

Of course, the Rethorst U.S. Pat. No. (3,588,005) has nothing to do with boattail drag; but it can be even further distinguished from the present invention since Rethorst uses only ridges, and these have a maximum height which is only approximately the laminar boundary layer thickness The Rethorst mechanism involves lateral flow of the laminar boundary layers over the ridges themselves i.e. it involves energizing laminar boundary layer only by local acceleration of that boundary layer as it proceeds over the top of the ridges. Note that Rethorst indicates his invention will work with ridges oriented normal to the streamwise flow direction, further indicating that the mechanism involved therein is the energizing of the boundary layer by having it flow over the ridges. This is similar in nature to the device described in U.S. Pat. No. 3,578,264 to Kuethe wherein crests or depressions which are only the height of the boundary layer are oriented generally normal to the flow and simply energize the boundary layer by creating vortices which transfer their energy to the boundary layer. Other types of vortex generators which are well known in the prior art operate on the principal of transferring energy from the free stream into the frictionally decelerated boundary layer, thereby providing energy to aid the flow in overcoming the adverse pressure gradient. Unfortunately, vortex generators of the type which protrude into the fluid stream create their own drag which detracts from their effectiveness.

The primary effect of the present invention is to provide a path for the boundary layer to skirt around the adverse pressure gradient itself. It does not require an identifiable vortex structure in the trough or on the ridges of the body. Neither does it require net flow over the ridges. As such the present invention is useful in preventing boundary layer separation for either turbulent or laminar flows.

The foregoing and other objects, features and advantages of the present invention will become more apparent in the light of the following detailed description of preferred embodiments thereof as illustrated in the accompanying drawing.

BRIEF DESCRIPTION OF THE DRAWING

FIG. 2A is a view representing a cross section of the airfoil of FIG. 2, but without the troughs and ridges formed therein.

FIG. 3 is a sectional view taken along the line 3—3 of FIG. 2.

FIG. 4 is a sectional view taken along the line 4—4 of FIG. 2.

FIG. 5a is an end view of the airfoil of FIG. 2 generally in the direction of the line 5a—5a of FIG. 3.

FIG. 5b is a sectional view of the airfoil of FIG. 2 taken along the line 5b—5b of FIG. 3.

BEST MODE FOR CARRYING OUT THE INVENTION

Figure 1:
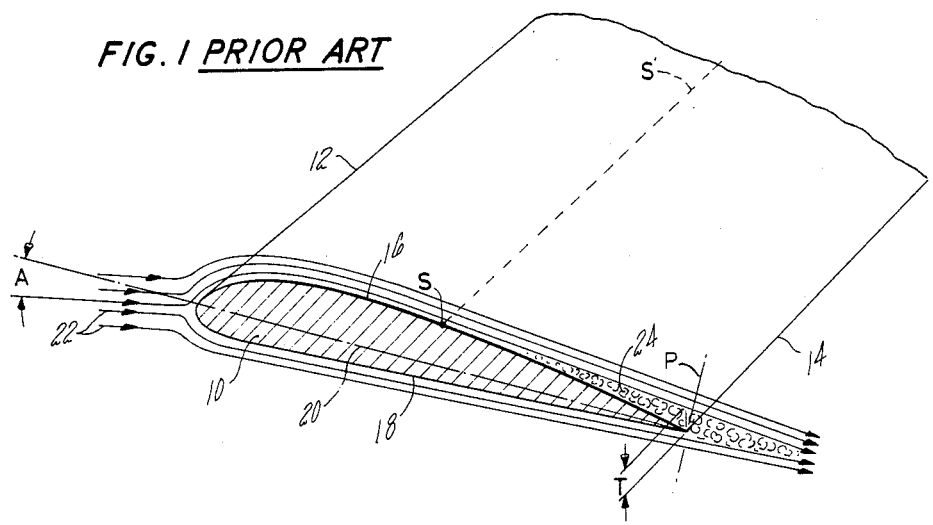
FIG. 1 is a prior art airfoil which is shown for the purpose of defining and explaining terms used in the application.

FIG. 1 is illustrative of the flow field around an airfoil shaped body 10 of the prior art which is oriented at an angle of attack great enough to result in two-dimensional boundary layer separation from the surface of the airfoil. For purposes of understanding the terminology used throughout the present application, the airfoil shaped body 10 includes a leading edge 12, a thin trailing edge 14, a suction surface 16, and a pressure surface 18. The airfoil cross section has a chord line 20. Fluid stream lines are represented by the reference numeral 22 and show the direction of bulk fluid flow relative to the surface of the body 10. The angle of attack of the body is designated by the reference letter A.

As used throughout this specification and claims, the phrase "airfoil shaped body" means a body which is considered to have an airfoil shape in cross section (i.e. a generally streamlined cross sectional shape). An airfoil shaped body having a "thin trailing edge" is a body whose trailing edge is so thin it does not, in and of itself, create significant base drag.

In the illustration of FIG. 1, the angle of attack is such as to produce high loading and cause the fluid stream lines to separate from the suction surface 16 at a point S at the cross section shown. The points S taken along a series of cross sections define a separation line S' along the suction surface of the airfoil. A separation region (or wake 24) is created downstream of the separation line S' which creates drag on the airfoil. The further upstream the separation line is located, the greater the drag on the airfoil and the lower the lift. For purposes which will become clear hereinafter, the thickness T of a separation region (or wake) is defined as the distance from the trailing edge to the outer edge of the separation region as measured in a plane P passing through the trailing edge and perpendicular to the airfoil mean chord line at the trailing edge.

With reference to FIGS. 2-5, a wing 30 according to the present invention has an airfoil shaped cross section. In this embodiment the wing 30 has a plurality of alternating troughs 32 and ridges 34 in the upper suction surface 36; and a plurality of alternating troughs 38 and ridges 40 in its lower pressure surface 42. Each trough 32, 38 has a pair of opposed sidewalls 43, 45, respectively. The troughs 32, 38 and the ridges 34, 40 extend generally along the expected streamlines of the bulk fluid flow over the wing in the vicinity of each ridge and trough.

FIG. 2A, shows what the airfoil cross section would be without the troughs and ridges. This is hereafter referred to as the "nominal" airfoil cross section. Assuming the wing 30 had a constant cross section identical to the nominal cross section, a separation line S' for any preselected angle of attack may be determined. To avoid separation, the upstream ends of the troughs 32 and ridges 34 must necessarily be located upstream of this separation line for that angle of attack. Such troughs and ridges then extend to the trailing edge of the airfoil.

If boundary layer separation is not a problem on the pressure surface of the airfoil, the length of the troughs and ridges in the pressure surface is not critical, other than to assure that the troughs flow full. FIG. 3 is a cross section taken through the wing 30 along the bottom of a trough 32. The outline of the nominal airfoil cross-section is superimposed over this cross section as a phantom line 46. As can be seen in FIG. 3, the trough depth increases from zero at its upstream end 48 to a maximum depth at the trailing edge 39 of the airfoil. Since the thickness of the nominal airfoil cross section decreases toward the trailing edge, the trough surface eventually falls below the location of the nominal pressure surface of the airfoil, such as at 50. A further extension of the trough downstream of the point 50 necessarily requires the formation of one of the ridges 40 in the lower pressure surface of the airfoil. Similarly, each ridge 34 is disposed above the upper suction surface of the nominal airfoil shape 46. In order that the airfoil trailing edge 39 remains thin, a corresponding trough 38 must be formed in the lower pressure surface of the airfoil. The trailing edge 39 of the airfoil therefore takes on a wave shape. From FIGS. 3 and 4 it is seen that, in this embodiment, the airfoil thickness decreases toward the trailing edge over the length of the troughs and ridges; and the peaks of the ridges in both the suction and pressure surface follow the nominal airfoil cross-sectional shape almost to the trailing edge.

Figure 13:
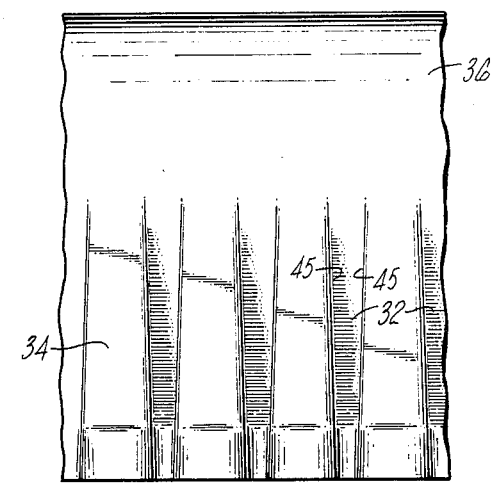
FIG. 13 is a view of the suction surface of the wing of FIG. 2, taken along the line 13—13 of FIG. 3.
Figure 15:
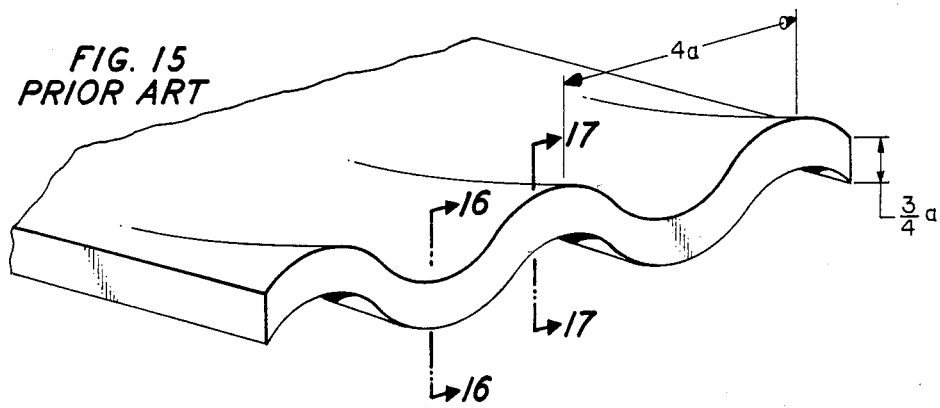
FIG. 15 is a perspective view of a "blade" in accordance with the prior art.
Figure 16:
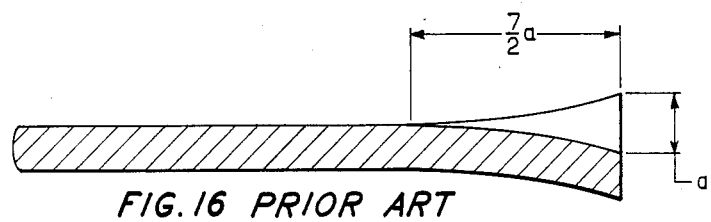
FIG. 16 is a cross-sectional view taken along the line 16—16 of prior art FIG. 15.
Figure 17:
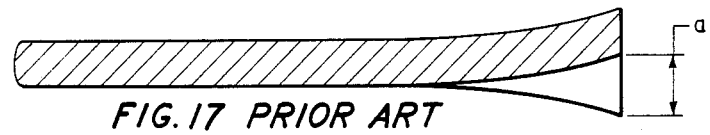
FIG. 17 is a cross-sectional view taken along the line 17—17 of prior art FIG. 15.

As shown in FIG. 13, the distance between the sidewalls 45 of the troughs in the suction surface decreases toward the trailing edge to create convergent passages. The convergent passages have an accelerating effect on the flow within the troughs. The acceleration of the bulk fluid flow within converging troughs is believed to add momentum to the boundary layer, although the advantages would be only secondary to those provided by the existence of the troughs and ridges themselves. Also, converging troughs in the suction surface decrease the suction surface pressures, and thereby may tend to increase lift. In view of these benefits, converging suction surface troughs are preferred, but not required.

Since the troughs and ridges in both the pressure and suction surfaces virtually meet near the trailing edge to form the wave-like shape of the trailing edge, it follows that the converging troughs in the suction surface will necessarily result in diverging trough portions in the pressure surface, thereby increasing pressure. The increased pressure may also increase lift.

In this embodiment the troughs and ridges are U-shaped at any cross section taken perpendicular to their length, and they blend with each other (i.e. no sharp edges) so that the airfoil surface is a series of relatively smooth undulations which minimize the formation of drag producing axial vortices. The shape and contour of the ridges and troughs along their length are preferably selected to assure that two-dimensional boundary layer separation does not occur anywhere on the surface, such that the troughs flow full along their entire length. For the same reason the rate of increase in trough depth and the rate of increase in ridge height cannot be excessive. Optimizing the size and shape of the troughs and ridges may have to be done by trial and error, and will depend, for example, on the desired operating angle of attack and the nominal airfoil cross-sectional shape. In some cases amplitude M (FIG. 5a) at the trailing edge of only about twice the 99% boundary layer thickness (measured immediately upstream of the upstream ends of the troughs) may be sufficient. Preferably M should be at least about four times the 99% boundary layer thickness. It is believed that best results will be obtained when the amplitude M at the trailing edge is at least the same as and most preferably about twice the maximum thickness T of the separation region which would have formed at the selected operating angle of attack for the same body having the nominal airfoil cross section over its entire length. An amplitude M which is too small may result in delaying the onset of separation, without preventing it completely. The present invention is intended to encompass any amplitude which provides beneficial results.

If W is the distance between the peaks of adjacent ridges at the trailing edge (i.e. the "wavelength" at the trailing edge), the ratio of W to M is preferably no greater than about 4.0 and no less than about 0.5, in order to induce sufficient lateral pressure gradients without encountering significant viscous losses.

In cases where separation from the pressure side of the airfoil is not a problem, the troughs and ridges should be designed to best deal with the separation on the suction surface, with the shape and size of the pressure surface troughs and ridges being more or less dictated by what is needed in the suction surface. It may also be desirable, in certain circumstances, to have substantially identically shaped and sized ridges and troughs in both the upper and lower surface of the airfoil. Furthermore, there may be practical reasons, such as manufacturing considerations and structural requirements, that dictate the use of a size, shape and length of trough and ridge which is not optimum, but which is highly beneficial. In such instances the troughs may not flow full over their entire length, but will at least delay the onset of separation.

Wind tunnel tests were run on two airfoils, one being an NACA 65 series, 21% thick airfoil of standard shape, and the other being an identical airfoil modified in accordance with the teachings of the present invention. The modified airfoil had an appearance similar to that of the airfoil shown in FIG. 2. Both the modified and unmodified airfoil had a chord length of 3.0 inches and a span or transverse length of 9.0 inches, and a trailing thickness of 0.03 inch. The troughs and ridges had their upstream ends located 1.78 inches from the trailing edge, which was near the location of the thickest (0.63 inch) area of the airfoil cross section. At the trailing edge the wavelength W was 0.624 inch; the trough width D (FIG. 5a) in the suction surface was 0.178 inch; the trough width E in the pressure surface was 0.386 inch; and the amplitude M was 0.312 inch. The suction surface troughs converged from a width of 0.282 inch at their upstream ends, to 0.178 inch at the trailing end. The pressure surface troughs diverged from 0.282 inch to 0.386.

Figure 6:
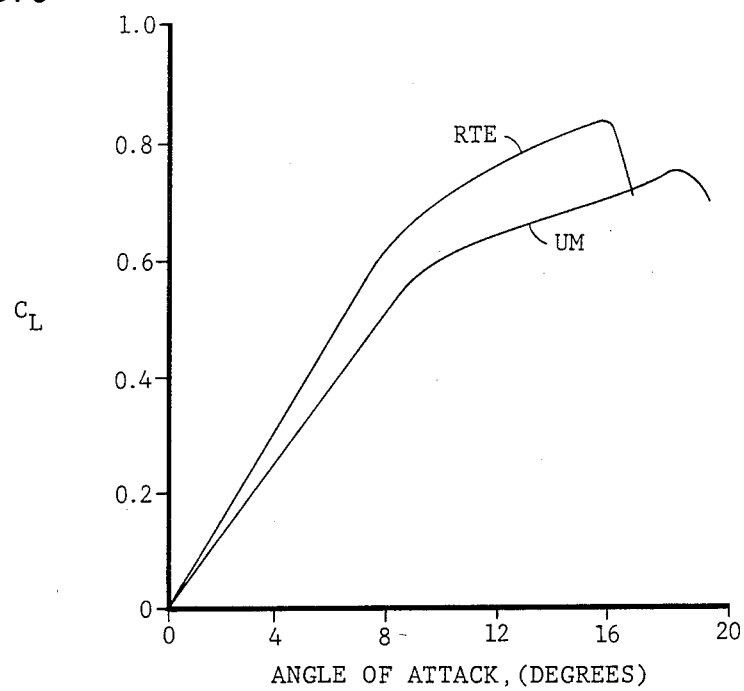
FIG. 6 s a graph including a lift coefficient curve for an airfoil similar to the one shown in FIG. 2, for various angles of attack, including a similar curve for the same airfoil without the present invention, for purposes of comparison.

The lift curves for the test airfoils are shown in FIG. 6. The lift curves are plots of lift coefficients CL at various angles of attack "A". The curve for the unmodified airfoil is labelled UM. The curve for the airfoil modified in accordance with the present invention is labelled RTE, which stands for "Rippled Trailing Edge". It can be seen that greater lift occurred at all angles of attack for the RTE airfoil; and the RTE airfoil achieved about 15% greater lift before stall.

Figure 7:
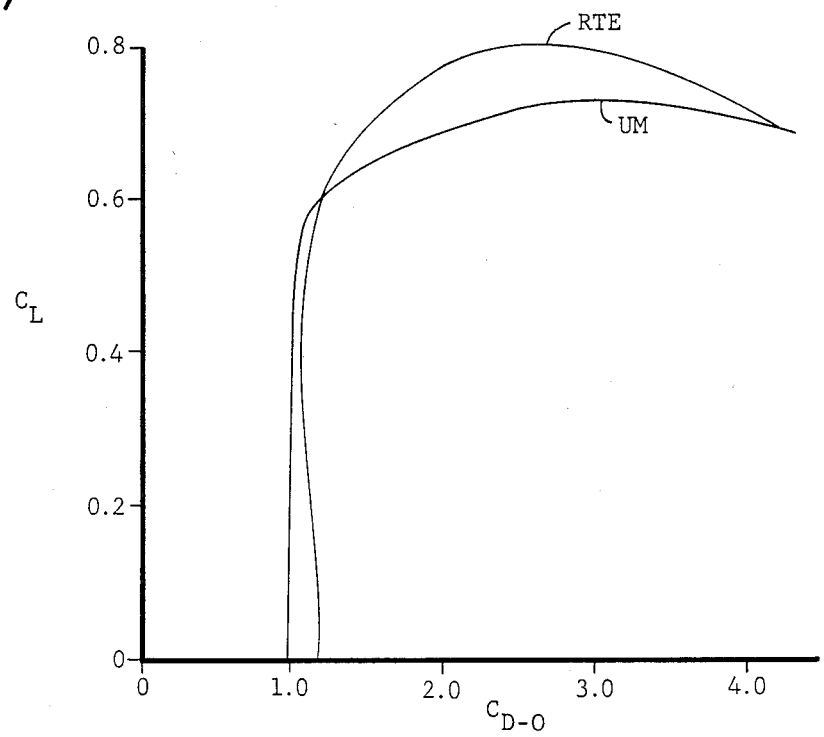
FIG. 7 is a graph showing the relationship between the coefficient of lift and coefficient of drag for an airfoil similar to the airfoil shown in FIG. 2, including a curve showing such a relationship for the same airfoil without the present invention, for purposes of comparison.

FIG. 7 shows the drag polar curves for these tests, which is a plot of lift coefficient $C_L$ vs. the drag coefficient normalized to the unmodified airfoil's zero lift drag ($C_{D-0}$ in the graph). Although there is slightly increased drag for low lift conditions, the RTE airfoil demonstrated considerably increased lift for fixed drag under high lift conditions.

Figure 8:
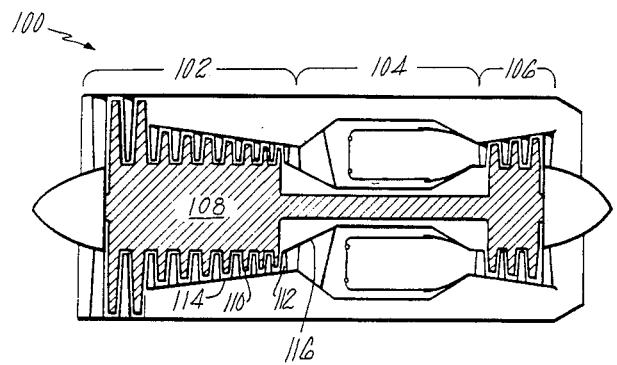
FIG. 8 is a schematic representation of a gas turbine engine incorporating stator vanes and rotor blades constructed in accordance with the teachings of the present invention.

FIGS. 8-12 show other applications for the present invention. In FIG. 8, a gas turbine engine 100 is shown schematically as including, in series, a compressor section 102, a burner section 104, and a turbine section 106. The compressor section 102 includes a rotor stage 108 comprising a plurality of circumferentially spaced apart rotor blades 110. The rotor 108 is followed by a stage of stationary, circumferentially spaced apart stator Vanes 112 The vanes 112 are attached at their inner ends to an inner engine casing 116, and at their outer ends to an outer engine casing 114.

Figure 9:
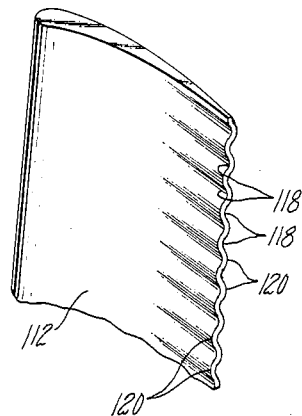
FIG. 9 is an enlarged view of the stator vane shown in FIG. 8.
Figure 10:
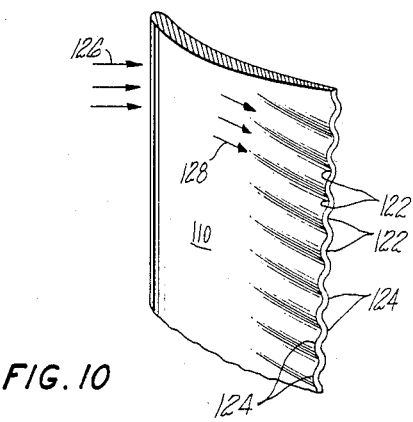
FIG. 10 is an enlarged view of the rotor blade shown in FIG. 8.

Both the rotor blades and the stator vanes incorporate the rippled trailing edge of the present invention, as more specifically shown in FIGS. 9 and 10.

Figure 2:
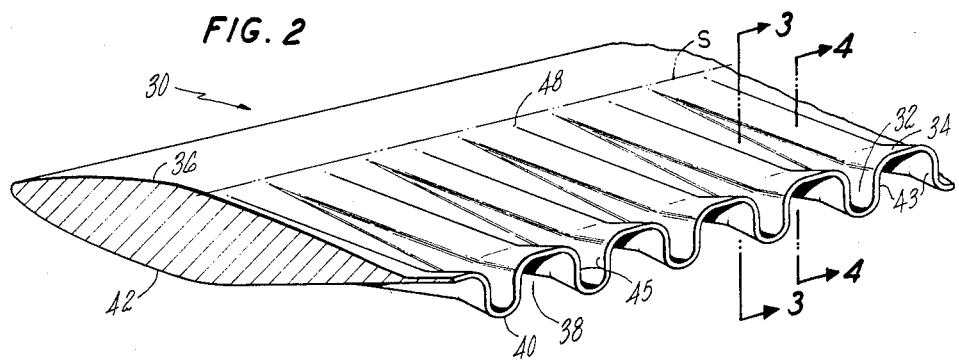
FIG. 2 is an illustrative, perspective view of an airfoil incorporating the present invention.

Referring to FIG. 9, both the pressure and suction surface of the vane 112 includes a plurality of alternating troughs 118 and ridges 120 extending over the trailing edge region, such that the stator vane has an appearance somewhat similar to the wing of FIG. 2. One point of distinction between the wing 30 and the vane 112 is that the pressure side of the vane is concave in the trailing edge region rather than convex. The present invention is equally applicable to either type of airfoil section, and even to a flat surfaced airfoil having a thin trailing edge.

As best shown in FIG. 10, each rotor blade 110 also has a plurality of alternating troughs 122 and ridges 124 in both the pressure and suction surfaces of the blade to form a relatively thin, wave-shaped trailing edge. For illustration purposes, assume that the working fluid approaches the rotor blade 110 in the direction represented by the arrows 126. Blade rotation imparts a radial component to the air as it moves downstream over the surface of the blade. By the time the fluid reaches the trailing edge region it may be moving, (relative to the blade 110) in the direction of the arrows 128, which represent the direction of bulk fluid flow at the location of the arrows. In accordance with the present invention, it is preferred to orient the troughs and ridges generally parallel to such bulk fluid flow direction in the trailing edge region.

Figure 11:
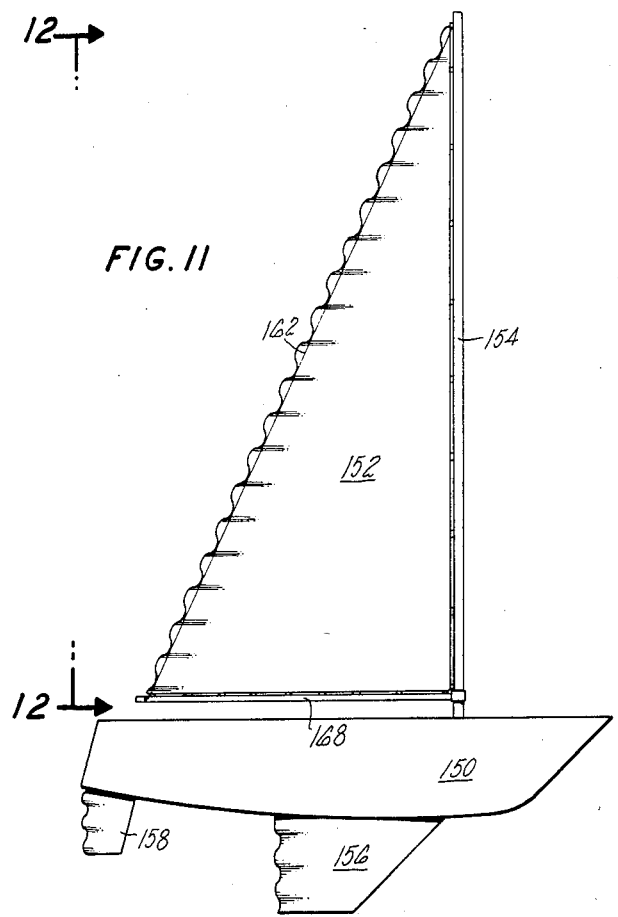
FIG. 11 is a simplified, illustrative perspective view of a sailboat having a sail, keel, and rudder all incorporating the features of the present invention.

With reference to FIG. 11, a sailboat is shown incorporating the present invention in several different locations, all for the primary purpose of reducing drag resulting from boundary layer separation. The sailboat comprises a hull 150, a sail 152 attached to a mast 154, a keel 156 and a rudder 158. The sail, keel and rudder all incorporate the present invention. Thus, the rudder and keel have airfoil cross sections and have troughs and ridges formed in their thin trailing edge regions to delay boundary layer separation from the surfaces thereof as the boat travels through the water.

Figure 12:
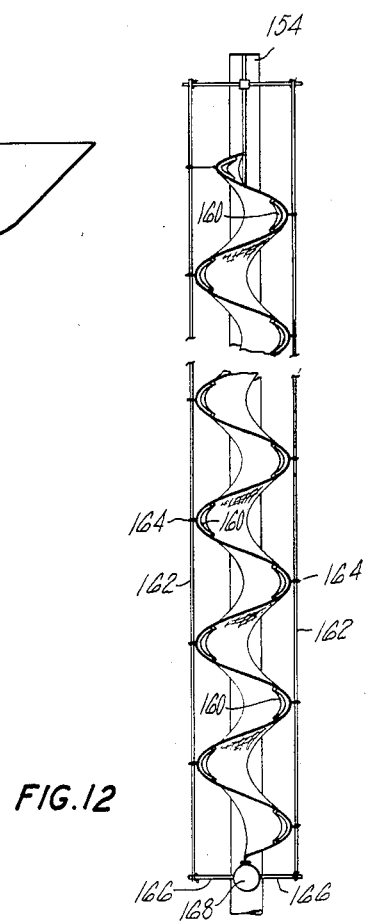
FIG. 12 is a view of the trailing edge of the sail of FIG. 11 taken generally in the direction 12—12 of FIG. 11.

With reference to FIG. 12, the sail 152 has local, curved reinforcements 160 along the trailing edge to create a series of smooth curves in alternate directions along the trailing edge (i.e. a wave-shape). Ropes 162 pass through eyelets 164 at the ridge peaks created by the reinforcements along each side of the sail, and are connected to the top of the mast and to lateral extensions 166 of the boom 168. By forcing the trailing edge to take on a wave shape, a plurality of alternating troughs and ridges in both sides of the sail will be formed along a region of the sail immediately upstream of and including the trailing edge. It is expected that the ridges and troughs formed in the trailing edge region of the sail will at least partially alleviate trailing edge separation on the suction surface of the sail, and attendant drag.

Figure 18:
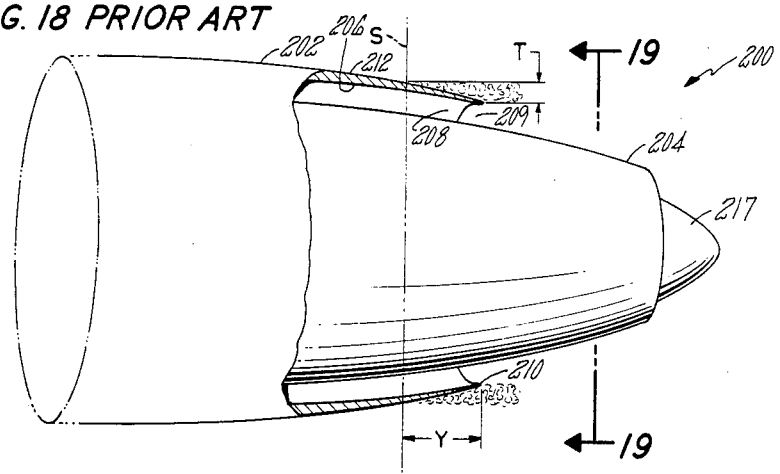
FIG. 18 is a simplified perspective view, partly broken away, of a bypass-type gas turbine engine of the prior art.
Figure 19:
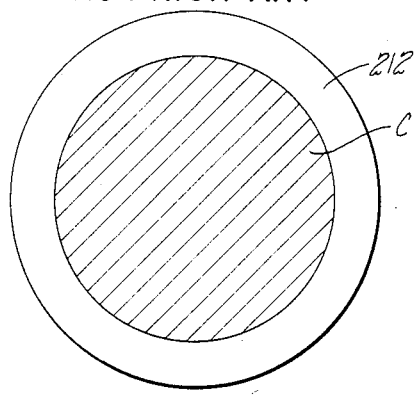
FIG. 19 is a simplified illustrative view taken generally in the direction 19—19 of FIG. 18.

The troughs and ridges of the present invention may also be used to eliminate two-dimensional streamwise boundary layer separation from the external downstream extending surface of a body having an unbounded fluid flowing thereover in the downstream direction, and which has an internal or inner downstream extending surface which forms a thin trailing edge with the external surface and surrounds a fluid flowing downstream within the body. Referring first to prior art FIGS. 18 and 19, a gas turbine engine 200 is of the fan bypass type and includes an annular casing or nacelle 202 surrounding and spaced from the core engine casing 204. The internal surface 206 of the nacelle 202 defines the outer surface of the fan bypass flow path 208, which has its outlet 209 at the thin, downstream or trailing edge 210 of the nacelle 202. The external surface 212 of the nacelle has a streamlined smooth convex shape in cross section (taken in the plane of the engine axis) to reduce drag created by the external, unbounded flow of air over the surface in the downstream direction. As depicted in the drawing, despite the streamlined nacelle shape, under certain operating conditions, such as at cruise which is where the engine (i.e., the aircraft) operates most of the time, two-dimensional boundary layer separation of the flow over the external surface 212 may initiate at the plane S at an axial distance Y upstream from the trailing edge. This is usually due to an excessive convex curvature required in order to achieve a particular cross-sectional area C (shown cross-hatched in FIG. 19) at the trailing edge for a particular nacelle length. The separation region, which often extends over a significant portion of the downstream part of the nacelle, has a thickness T, which is the radial distance from the trailing edge to the outer edge of the separation region as measured in a plane passing through the trailing edge and perpendicular to the engine axis. This separation region and its thickness are analogous to the separation region and its thickness described with respect to prior art FIG. 1. As described earlier, this separation region creates the well known and highly undesirable "boattail drag".

Figure 14:
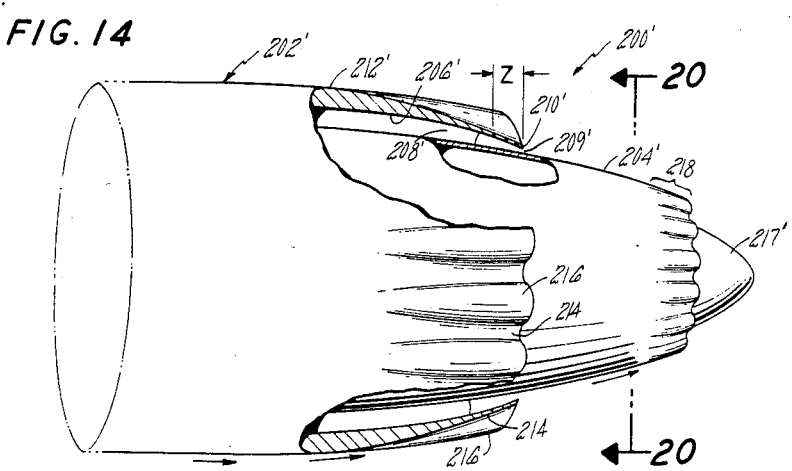
FIG. 14 is a simplified perspective view, partly broken away, of a gas turbine engine having external casings incorporating the features of the present invention.
Figure 20:
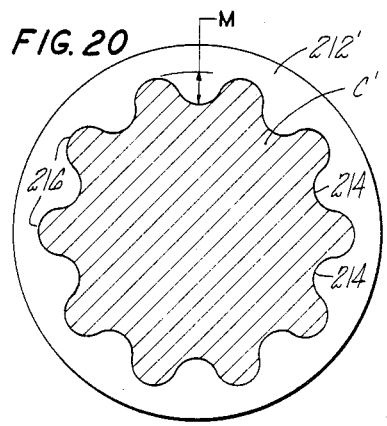
FIG. 20 is a simplified illustrative view taken generally in the direction 20—20 of FIG. 14.

The present invention, best shown in FIGS. 14 and 20, moves the initiating point of separation closer to the trailing edge and may even eliminate it entirely. Initiating upstream of where prior art separation would normally occur, a plurality of alternating, adjoining, smoothly undulating, generally U-shaped troughs 214 and ridges 216 are disposed in the external surface 212' (primed reference numerals correspond to the same numbered elements of prior art FIGS. 18, 19) and extend downstream, increasing gradually in depth and height, respectively to a maximum at the outlet 209°. Since the trailing edge 210' is thin, the troughs in the external surface 202' create corresponding ridges in the internal surface 206'; and the ridges in the external surface define corresponding troughs in the internal surface.

In FIG. 20 the core engine is omitted for purposes of clarity. The outlet area C' is the same as the outlet area C, to avoid changing the bypass ratio. As hereinabove discussed in detail with respect to airfoil-shaped bodies, the troughs and ridges are sized and contoured to flow full over at least a significant portion of and preferably over their entire length, whereby streamwise two-dimensional boundary layer separation from the external surface 212' is eliminated, or its onset is at least delayed (e.g. separation initiates at a distance Z upstream of the trailing edge, where Z is significantly less than Y or is preferably zero). For purposes of sizing and spacing the circumferentially spaced apart troughs and ridges using the guidelines hereinabove set forth with respect to airfoil shaped bodies, the wave amplitude M is measured radially, and the wavelength W or spacing between troughs will be an average of the radially outermost peak-to-peak arc length and the radially innermost peak-to-peak arc length. As also discussed with respect to airfoil shaped bodies, the amplitude M at the trailing edge is preferably at least the same as and most preferrably about twice the thickness T of the separation region which would have been formed using a smooth convex external surface according to the prior art.

As shown in FIG. 14, the core engine casing 204' also has an unbounded flow of fluid over its external surface. The casing 204' surrounds and is spaced radially outwardly from an engine tail plug 217 and forms part of the flowpath for the primary or core engine stream. Troughs and ridges according to the present invention are also incorporated in the trailing edge region 218 of the external surface of the casing 204' to eliminate or at least delay the onset of streamwise two-dimensional boundary layer separation.

In the embodiment of FIG. 14 the undulations formed in the casing 204' extend around the entire periphery of the outlet, and appear as a wave-shape when viewed from aft of the engine. If the engine casing had a rectangular outlet, such as for an engine having a two-dimensional exhaust nozzle, one or more of the sides of the casing could incorporate the troughs and ridges, since benefits will occur over whatever portion of the casing the present invention is used.

Although this invention has been shown and described with respect to preferred embodiments thereof, it will be understood by those skilled in the art that various changes in the form and detail thereof may be made without departing from the spirit and scope of the claimed invention.

We claim:

1. An annular nacelle adapted to surround a gas turbine engine, said nacelle having an inner surface and an external surface, said external surface including an upstream portion and a downstream portion adapted to receive an unbounded flow of fluid thereover in the downstream direction, said inner and outer surface extending downstream and forming a thin trailing edge of said nacelle, said trailing edge defining an outlet of said nacelle of cross-sectional area C, a plurality of alternating, adjoining, smoothly undulating generally U-shaped ridges and troughs formed in said downstream portion of said external surface, said ridges and troughs extending downstream from said upstream surface portion to said trailing edge, wherein said trailing edge is wave-shaped, said troughs in said external surface defining corresponding ridges in said inner surface and said ridges of said external surface defining corresponding troughs in said inner surface, and wherein said troughs and ridges are sized and contoured such that under a selected operating condition no significant streamwise two-dimensional boundary layer separation occurs on said external surface over the length of said troughs and ridges,
wherein a prior art non-undulating smooth convexly curved surface blending smoothly with said upstream portion external surface, extending to said trailing edge and having the same cross-sectional outlet area C would have streamwise boundary layer separation over said downstream portion of said external surface during said selected operating condition.

2. The nacelle according to claim 1 wherein said inner surface defines at least a portion of an exhaust gas path for a ga turbine engine.

3. The nacelle according to claim 1, wherein the sum of the depth of one of said troughs and height of an adjacent ridge at said trailing edge is between one and two times the thickness of what the eliminated prior art separation region would have been at the trailing edge.

4. In a gas turbine engine of the fan bypass type and including a core engine having an axis and including an annular nacelle surrounding said core engine to define the fan bypass therebetween, said nacelle having an external surface adapted to receive an unbounded flow of fluid thereover in the downstream direction and adapted to reduce surface drag, wherein said nacelle has a thin trailing edge defining an outlet of cross-sectional area C perpendicular to the axial direction, and wherein, if said external surface were streamlined and smoothly convex over a downstream portion of its length to said trailing edge, two-dimensional streamwise boundary layer separation would initiate at a distance Y upstream of said trailing edge of cruise operating condition, the improvement comprising:
a plurality of alternating, adjoining, smoothly undulating generally U-shaped ridges and troughs formed in said downstream portion of said external surface, said ridges and troughs extending downstream to said trailing edge a distance greater than Y, said troughs and ridges sized and contoured such that under cruise operating conditions two-dimensional streamwise boundary layer separation from said external surface does not initiate farther from said trailing edge than a distance Z, wherein Z is significantly less than Y or is zero.

5. The improvement according to claim 4 wherein under cruise conditions Z is zero and said trailing edge has a wave shape having an amplitude M which is at least the thickness of the eliminated cruise separation region at the trailing edge.

* * * * *